May 10, 1966  D. E. OLIVIER ETAL  3,250,888
MACHINE FOR MAKING WIRE CAGES
Filed July 30, 1963  9 Sheets-Sheet 3
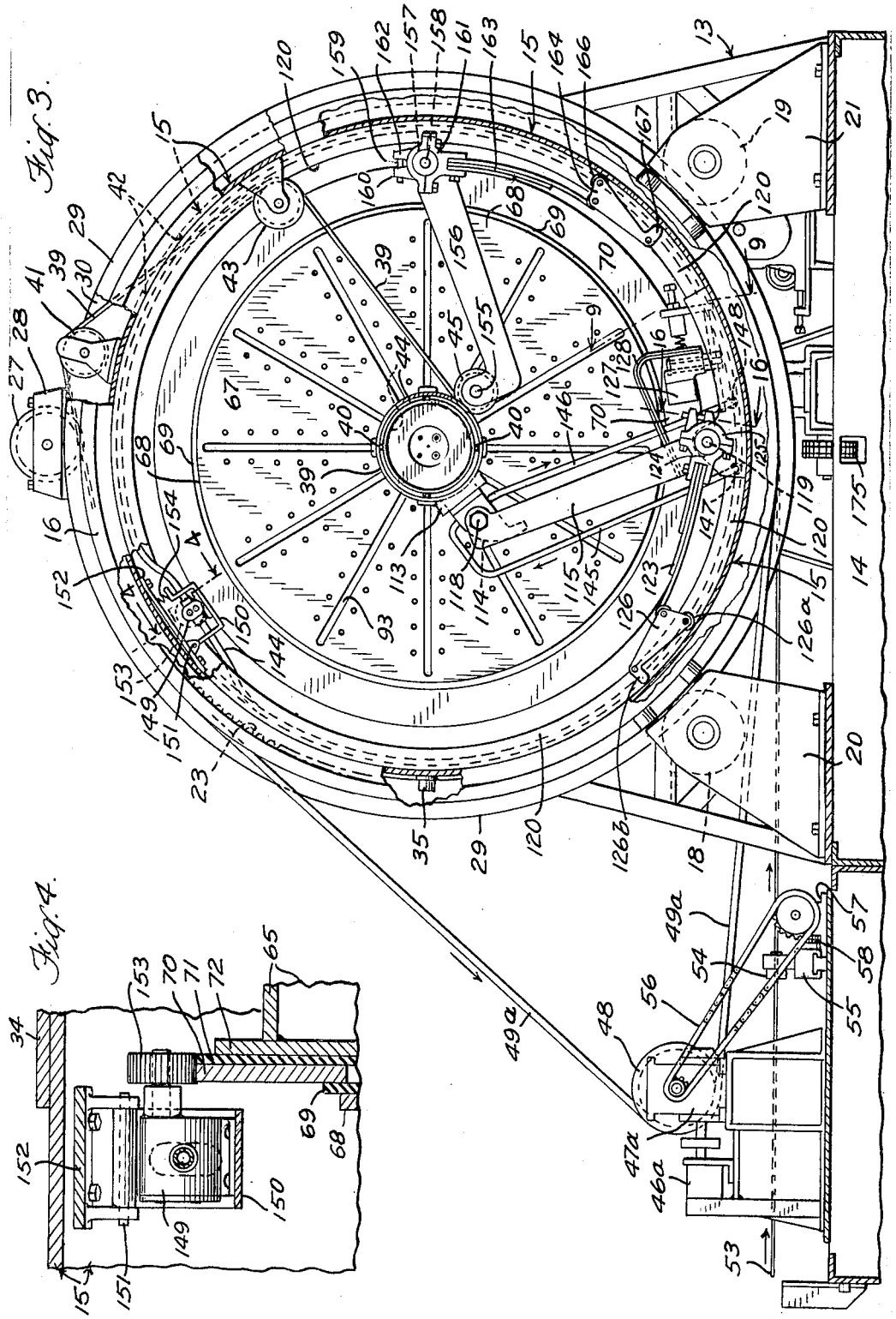

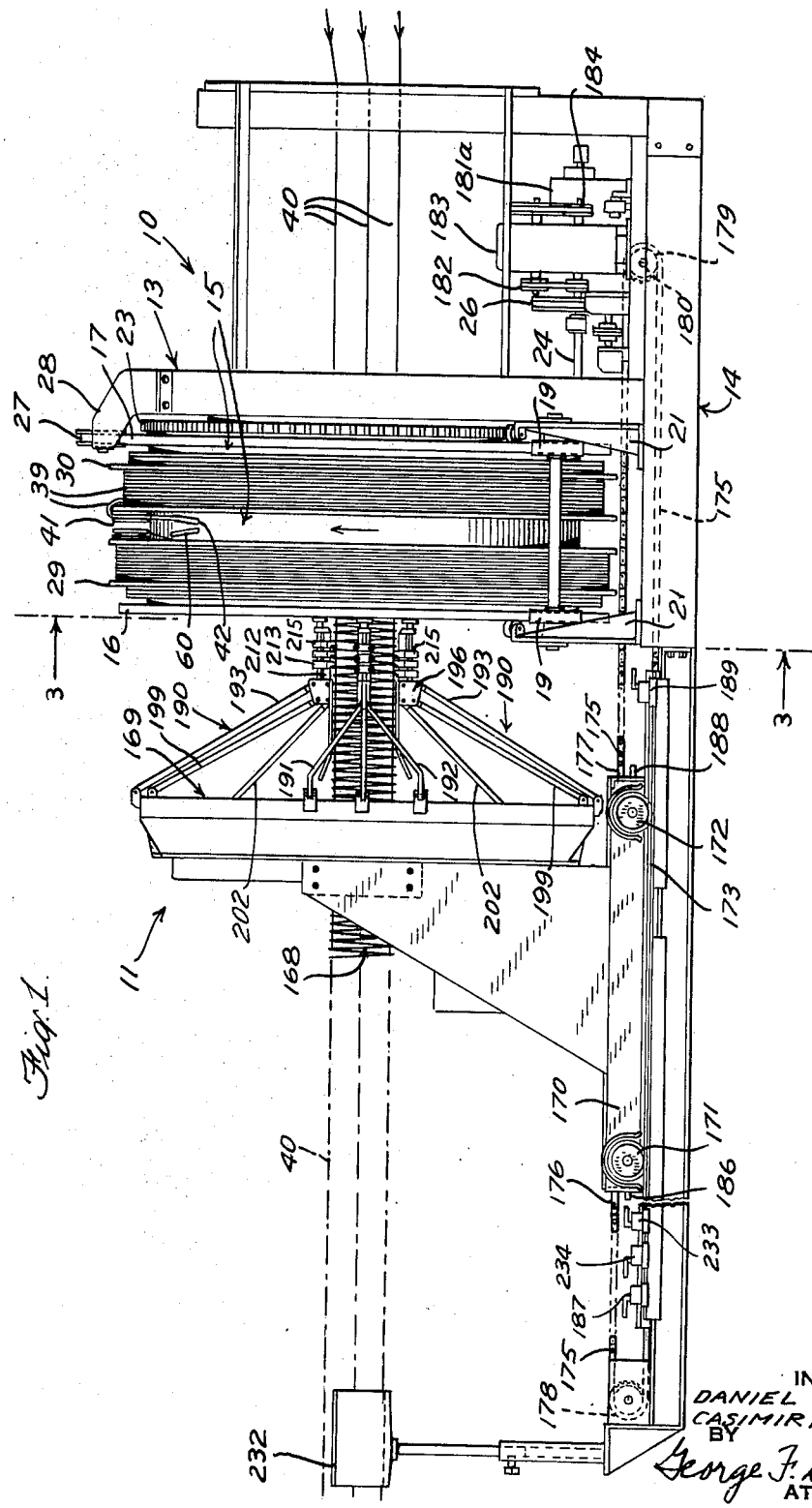

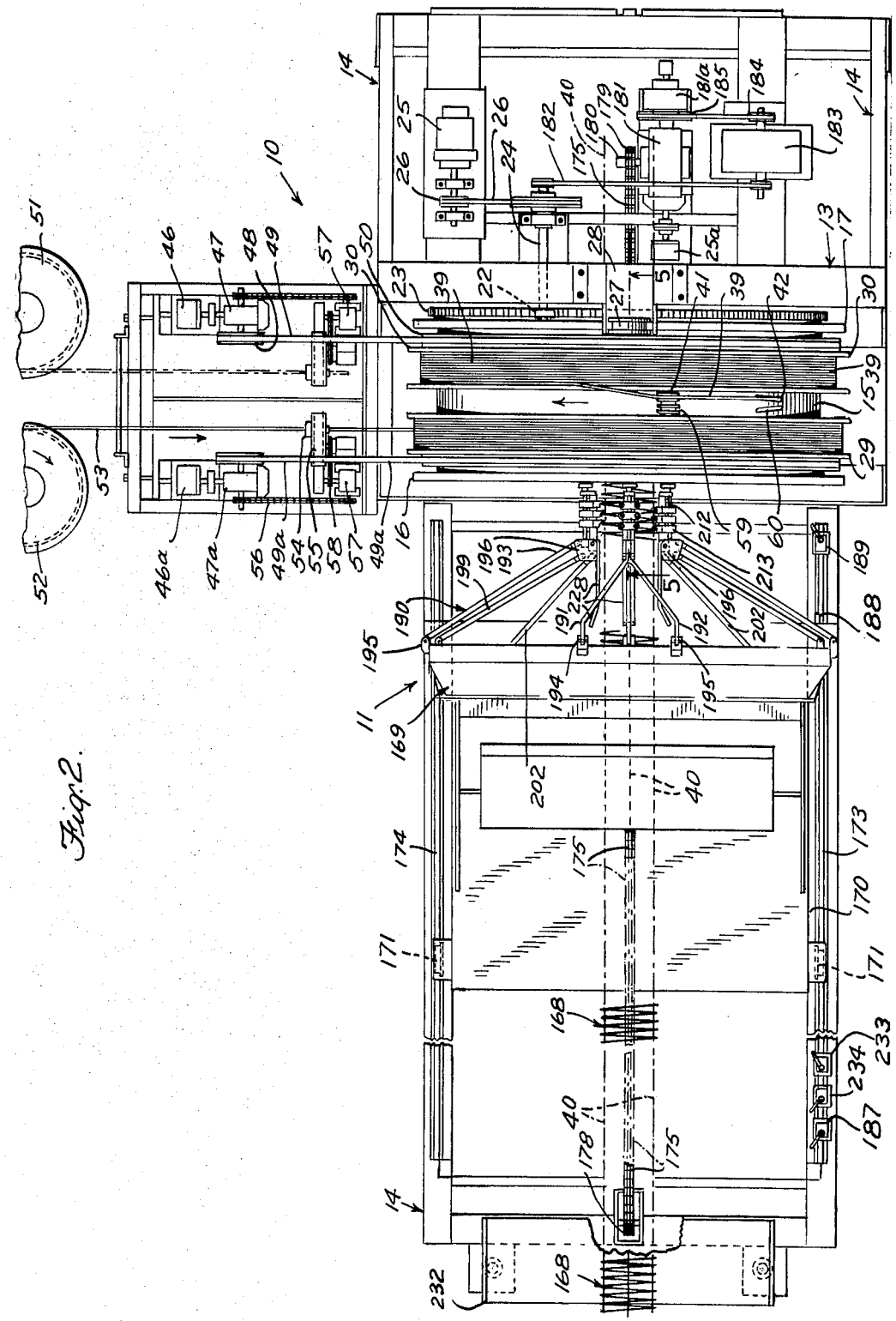

May 10, 1966   D. E. OLIVIER ETAL   3,250,888
MACHINE FOR MAKING WIRE CAGES
Filed July 30, 1963   9 Sheets-Sheet 6

INVENTORS
DANIEL E. OLIVIER
CASIMIR K. KOWALEWSKI
BY
George F. Des Marais
ATTORNEY

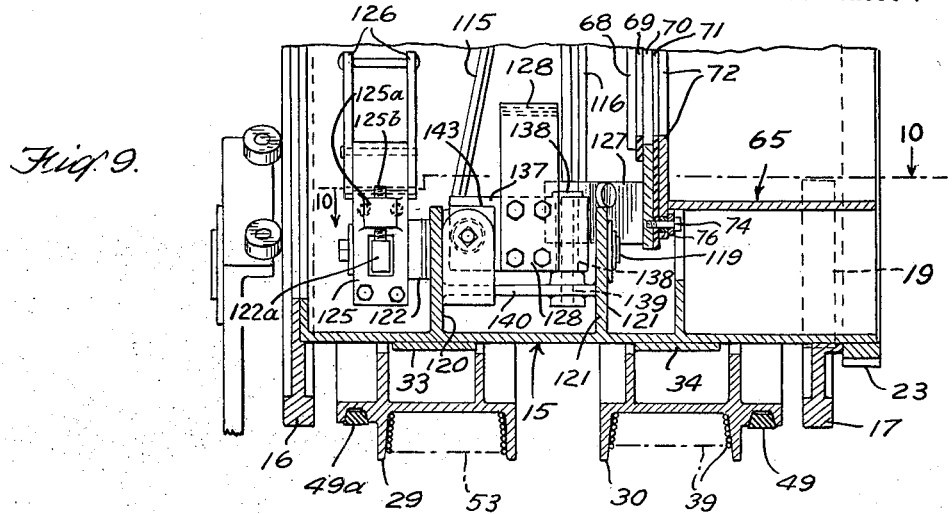
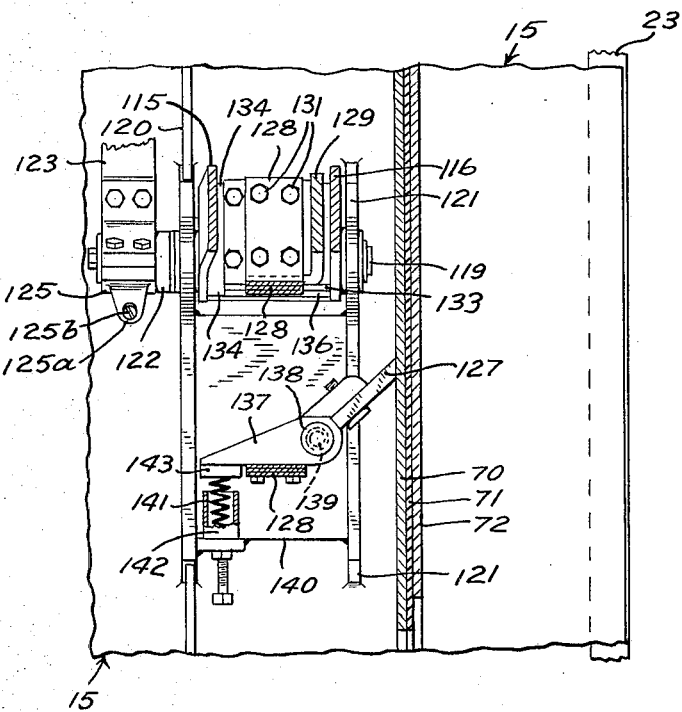

May 10, 1966 D. E. OLIVIER ETAL 3,250,888
MACHINE FOR MAKING WIRE CAGES
Filed July 30, 1963 9 Sheets-Sheet 8
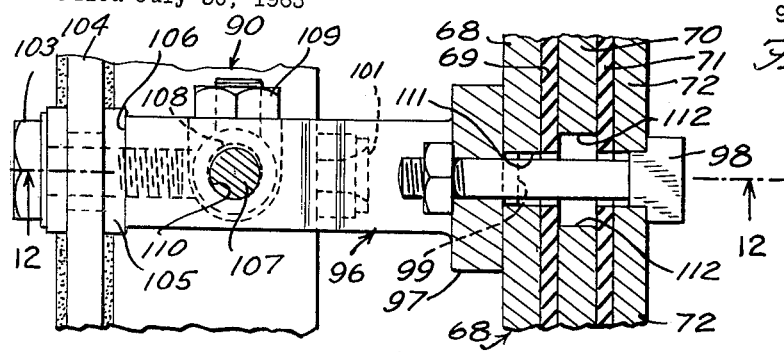
Fig. 11.
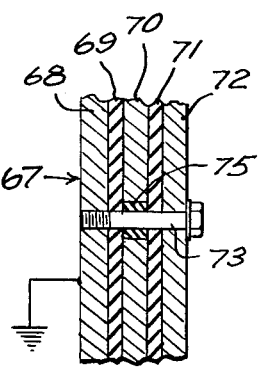
Fig. 13.
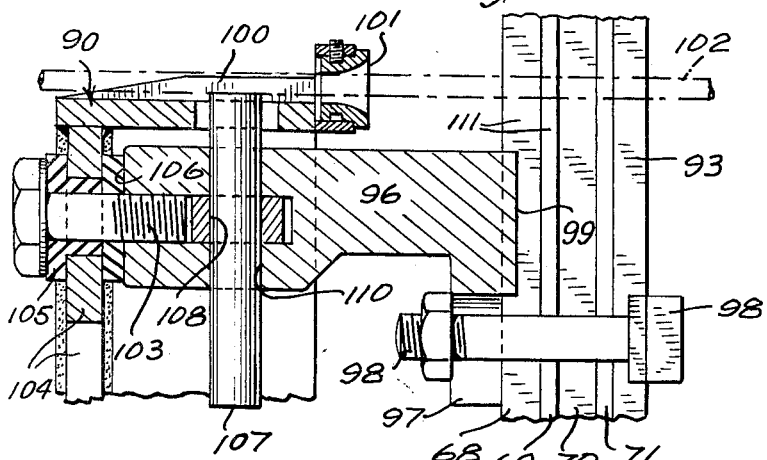
Fig. 12.
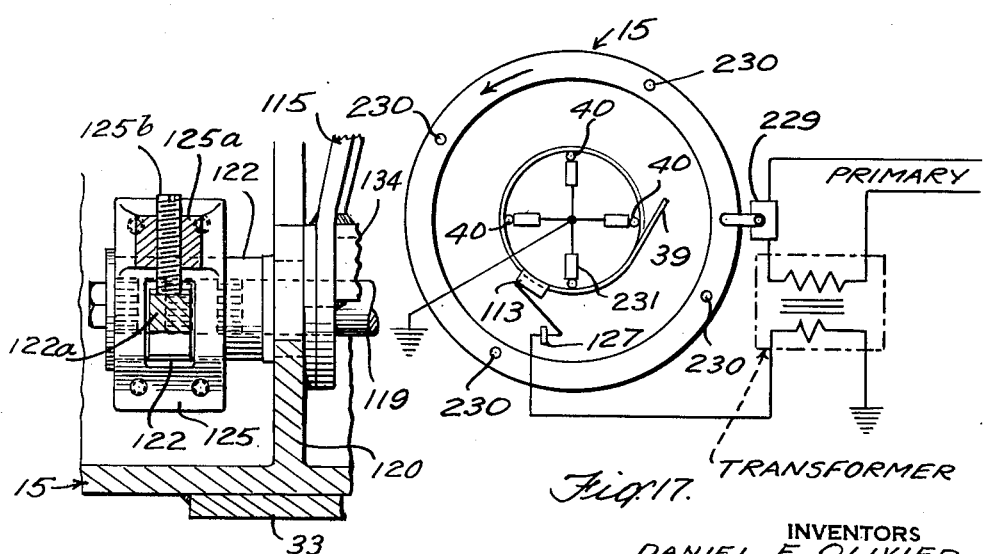
Fig. 16.
Fig. 17.
INVENTORS
DANIEL E. OLIVIER,
CASIMIR K. KOWALEWSKI
BY
George F. Des Marais
ATTORNEY

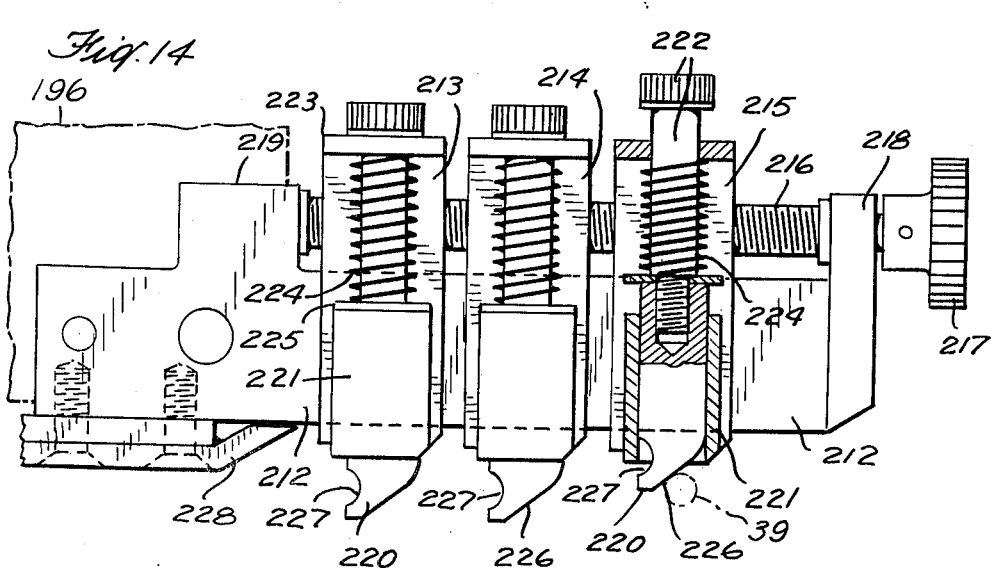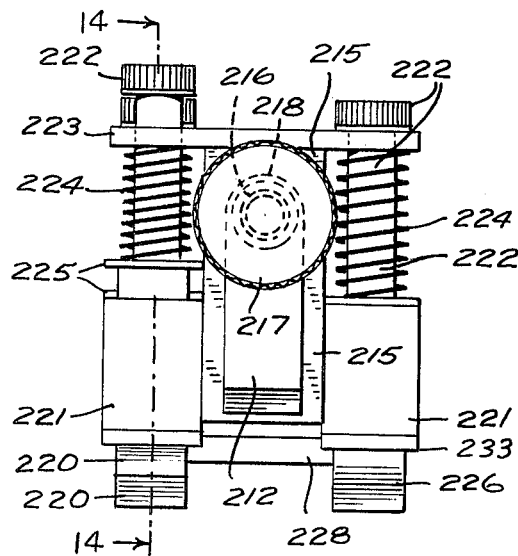

United States Patent Office 3,250,888
Patented May 10, 1966

3,250,888
MACHINE FOR MAKING WIRE CAGES
Daniel E. Olivier, Bedminster, and Casimir K. Kowalewski, Bloomfield, N.J., assignors to International Pipe and Ceramics Corporation, East Orange, N.J., a corporation of Delaware
Filed July 30, 1963, Ser. No. 298,668
15 Claims. (Cl. 219—56)

The present invention relates to machines for making wire cage structures.

Among the objects of the invention is to provide a machine for constructing a wire cage by applying a wire circumferentially around a plurality of longitudinally extending wires and welding the applied wire to the encircled wires at crossing points as the longitudinal wires are advanced lengthwise or axially of a stationary mandrel around which they are spacially distributed; to provide welding means including a welding shoe, carried by a rotating drum and contacting with the circumferential wire being applied, a number of stationary electrodes corresponding in number to the longitudinal wires being employed and individually contacting therewith, a stationary transformer, and means for completing a circuit from the transformer to effect welds as the welding shoe rotates around a stationary mandrel and passes intersections between the circumferential wire and the longitudinal wires; to provide means for distributing current from a stationary transformer to a rotating electrode and any one of a plurality of fixed electrodes, including a pair of conducting plates, a supporting plate, means insulating the plates from one another and from the ground, said plates being constructed and arranged for allowing the passage of longitudinally extending wires therethrough in spaced relationship in one or another arrangement on circles of different diameters; to provide means for controlling the rotation of a supply spool and the delivery of wire to a rotating wire-applying means for automatically maintaining a uniform backdrag on the wire as the wire is paying off from the supply spool; to provide for having at hand a reserve of wire in readiness on the machine for supplementing wire in the course of being applied around longitudinally extending wires; to provide means for pulling or advancing the forward movement of longitudinally extending wires of a cage at any desired rate and in relation to the rate of winding a wire around the longitudinally extending wires; to provide a pulling cart carrying a plurality of devices distributed around a cage and having adjustably positionable arms and fingers for gripping the cage; and to provide a machine for forming a welded wire cage of indeterminate length.

Further objects and the principle of the present invention are set forth in the accompanying specification and claims and demonstrated by the drawings which show by way of illustration a preferred embodiment and the best mode we have contemplated for carrying out the invention. Other embodiments of the invention employing the same principle may be used and structural changes made as desired by those skilled in the art within the spirit of the appended claims and without departing from the present invention.

In the drawings,

FIG. 1 is a side elevation of a machine embodying the invention;

FIG. 2 is a plan of the machine shown in FIG. 1;

FIG. 3 is an enlarged elevational view on line 3—3 of FIG. 1 showing the main drum with parts broken away;

FIG. 4 is a detail along line 4—4 of FIG. 3;

FIG. 9 is an enlarged detail on line 9—9 of FIG. 3;

FIG. 10 is a sectional view on line 10—10 of FIG. 9;

FIG. 11 is an enlarged sectional view on line 11—11 of FIG. 8;

FIG. 12 is a section on line 12—12 of FIG. 11;

FIG. 13 is an enlarged sectional detail on line 13—13 of FIG. 7 showing the manner in which current-distributing plates and insulating plates are bolted together;

FIG. 14 is a side elevation of a cage-gripping mechanism with a finger unit shown in section on line 14—14 of FIG. 15;

FIG. 15 is an end elevation of a cage-gripping mechanism;

FIG. 16 is an enlarged view on line 16—16 of FIG. 3;

FIG. 17 is a timing diagram for energizing the welding circuit of the transformer.

Figure 5:
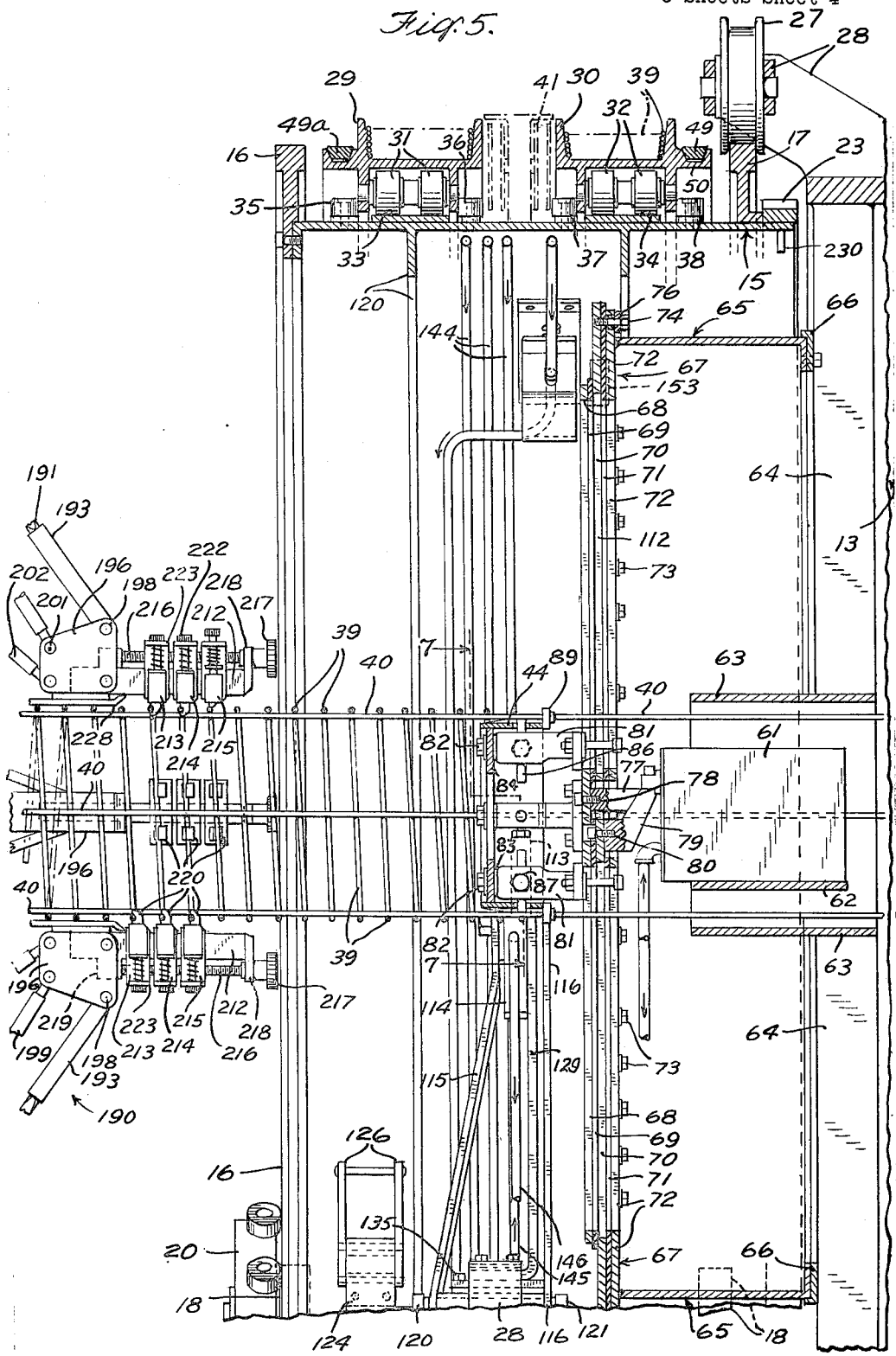
FIGS. 5 and 6 are enlarged vertical sectional views on the line 5—5 of FIG. 2 showing, respectively, the upper and lower portions of the wire-applying drum.

The machine of the present invention is capable of making a continuous wire cage having a length which is limited only by the length of the space in which the machine is housed. The machine is employed for making reinforcing cages for concrete pipes, but it is suitable for forming welded cages for other purposes in cylindrical form and in other generally circular configurations. Cages having a variable number of longitudinal wires may be made and the machine is adjustable for making cages of different sizes. The machine includes wire applying means which rotate around the longitudinal wires and welds the circumferentially applied wires to the longitudinal wires as the latter advance along a stationary mandrel. Welding current is supplied from a stationary transformer to fixed electrodes which contact with the advancing longitudinal wires and to an electrode which is carried by the wire-applying means. The latter electrode is maintained in contact with the circumferential wire. Welding occurs as the rotating electrode passes an intersection of the circumferential wire and a longitudinal wire.

The machine includes a plurality of spools for containing circumferential wire and means for filling one of the spools and for controlling the rotation of the other spool while the machine is operating and circumferential wire is paying off from the latter spool and being applied around the longitudinal wires. A cart or carriage having devices for engaging the cage pulls the cage and the trailing longitudinal wires as the circumferential wire is wound around the longitudinal wires and means are provided to vary the pitch of helixes formed by the circumferential wire. The winding of a circumferential wire is temporarily interrupted when the cage reaches the limit of its run and the cart is automatically run backward to a new location for continuing the making of the cage.

Referring to FIGS. 1 and 2, the machine includes a wire-applying mechanism generally shown at 10, a cage-pulling cart 11, a rigid frame 13 extending upwardly from a main base 14, and various operating mechanisms. A drum 15 has a pair of trunnion rings 16, 17, bearing on two pairs of rollers 18 and 19 (FIG. 3) which are mounted on brackets 20 and 21, fastened to the main base 14. The drum is rotated counterclockwise, FIG. 3, by a pinion 22, FIGS. 2 and 6, which meshes with a ring gear 23 on the drum. Pinion 22 is mounted on a shaft 24 driven from a motor 25 by a pulley and timing belt connection 26. The drum is held downwardly on its supporting rollers by a roller 27 which bears upon the trunnion ring 17. The roller 27 is journalled in a block 28 secured to the frame 13.

Spools 29 and 30, containing circumferential wire, are rotatably mounted on the drum 15 by pairs of rollers 31, 32, FIG. 5, which are journalled on the respective spools and bear upon wearing plates 33, 34, around the exterior of the drum 15. A plurality of rollers 31, 32 are distributed around the drum in spaced relationship. The spool 29 is restrained from axial movement with respect to the drum by a number of rollers 35 and 36 at opposite sides of the spool. The spool 30 is similarly restrained by a number of rollers 37 and 38 at the opposite sides of the spool. The side rollers are carried by the drum 15. The spools are thus mounted for rotation differentially with respect to each other and with respect to the main drum 15.

As illustrated in FIGS. 1, 2 and 3, the wire 39 is being wound around the longitudinal wires 40. The wire 39 is paying off from the spool 30, passing over the guide sheave 41, through the opening 42 in the drum and over the guide sheave 43, FIG. 3. The guide sheaves 41 and 43 are mounted on the drum. The wire passes from the guide sheave 43 to around a stationary mandrel 44 against which it is pressed by a pivotally mounted locating wheel 45. The locating wheel is carried by the drum 15. The means for supporting the locating wheel will be described hereinafter.

The longitudinal wires 40 are distributed in spaced relationship around the mandrel in any number desired within the capacity of a given machine. Only four longitudinal wires are shown in the drawings in the interest of simplifying the illustration of the principles involved.

The spool 30 rotates in the same direction as the drum 15 as circumferential wire is paying off from a spool. The rotation of the spool 30 is controlled by an hydraulic motor 46 which is coupled to a speed reducer 47, FIG. 2, driving a pulley 48 and a belt 49 which passes to an annular groove in the flange 50 of the spool 30, FIG. 5. The motor 46 is operated to exert a uniform back drag on the rotation of the spool as the spool is paying off wire to the mandrel.

The motor 46 is also employed to rotate the spool 30 when the spool is being loaded with a new supply of circumferential wire. A supply coil 51 is shown in FIG. 2 in readiness for supplying wire to the spool 30 after the wire on the spool has been exhausted. Another supply coil 52 is in position to load a reserve supply of circumferential wire 53 onto the spool 29.

Either of the spools 29 and 30 can be loaded with wire while the other spool is paying off wire to the mandrel. In loading the spool 29, for example, the spool is rotated through the operation of an hydraulic motor 46a, a speed reducer 47a and a belt drive 49a. As best shown in FIG. 3, the wire 53 passes through the guiding eye 54 to the underside of the spool 29. The eye 54 is carried by a slide 55 which derives its motion from the speed reducer 47a, a chain drive 56, a speed reducer 57, a chain 58 which carries a pin by which the slide 55 is reciprocated. Any suitable conventional reciprocating mechanism for evenly laying the wire onto the spool can be employed. When the spool is fully loaded, the exposed end of the wire can be lashed to the spool and the spool left free to seek its own position on the drum 15 until a new length of wire is required for continuing the winding of wire around the mandrel.

When the supplemental supply of wire on the spool 29 is required to be used, its leading end is run over the sheave 59 (FIG. 2), through an opening 60 in the drum 15 and thence around the sheave 43 (FIG. 3) to the mandrel 44 where it is welded to one of the longitudinal wires to continue the winding of circumferential wire around the mandrel. It is to be understood that the means for controlling the rotation of the respective spools either while wire is paying off from a spool or for loading a spool with a supplemental wire are duplicates of one another.

Figure 8:
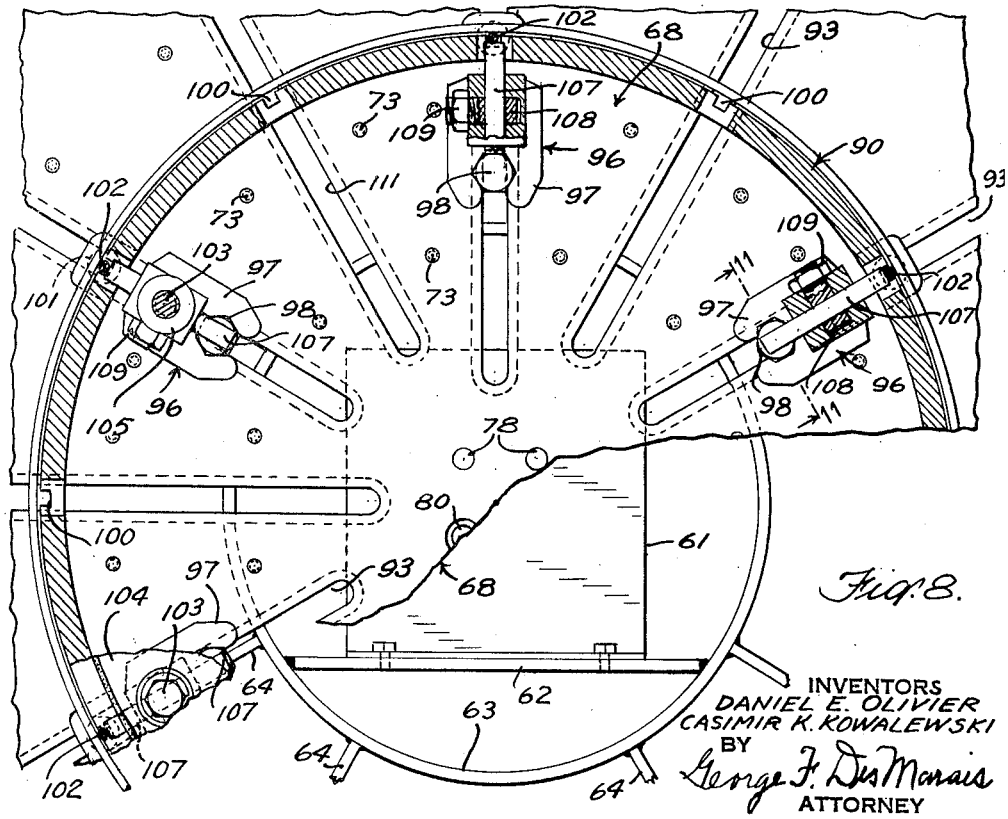
FIG. 8 is a view similar to FIG. 7, but showing a modified form of brackets for supporting a mandrel and electrodes.

A transformer 61 is bolted to a plate 62 which is secured to a sleeve 63, FIGS. 5 and 8. The sleeve 63 is welded to a plurality of stays or spokes 64 which extend outwardly to and constitute parts of the fixed frame 13. The mandrel 44 and the current distributing means between the electrodes and the transformer are located to the inside of the main drum 15, and are rigidly supported by a collar 65 which is bolted to a ring 66 welded to the stays 64 of the frame 13.

The current distributing means, which is generally indicated at 67, includes a conducting plate 68, an insulating plate 69, a current-conducting plate 70, an insulating plate 71, and a supporting plate 72 which is welded to the collar 65. The sandwich of conducting and insulating plates is clamped and is secured to the supporting plate 72 by a plurality of bolts 73, FIGS. 3, 7, 8 and 13, and a set of bolts 74 distributed around the edge of the supporting plate 72. Each of the bolts 73 is insulated from the plate 70 by a non-conducting washer 75, FIG. 13. Each of the bolts 74 extends between the plate 70 and the supporting plate 72 and is insulated from the supporting plate by a non-conducting bushing and washer 76, FIGS. 5 and 6.

The ground transformer-terminal 77 extends through an opening at the center of the plates and is bolted to the ground current-distributing plate 68 by a bolt 78. The hot terminal 79 of the transformer is connected to the hot current-distributing plate 70 by a bolt 80.

Figure 7:
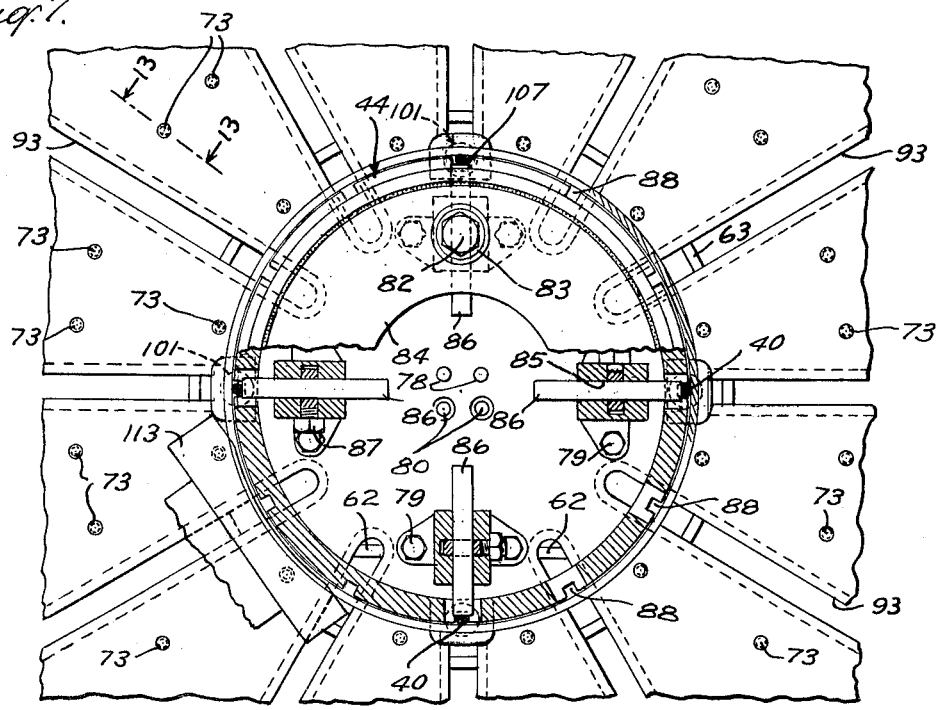
FIG. 7 is an enlarged view of the forward end of a mandrel as seen from line 7—7 of FIG. 5, with parts broken away.

The mandrel 44 is supported centrally of the axis of the drum by a plurality of brackets such as are shown at 81 in FIGS. 5 and 7. The mandrel-supporting brackets bear against the ground current-distributing plate 68 to which they are bolted by the bolts 79. Bolts 82 hold the mandrel 44 to the bracket 81. The bolts extend through insulating bushings and washers 83 in the flange 84 of the mandrel 44. The number of brackets correspond to the number of longitudinal wires which are employed in making a particular cage. Each bracket is made of conducting material and is provided with a hole 85, FIG. 7, for containing an electrode 86 which is clamped in an adjusted position by an eye-bolt 87. In FIG. 7, only four longitudinal wires and four brackets are illustrated to simply the drawing, but it will be understood that the number of brackets used corresponds with the number of longitudinal wires which are to be used in making a cage.

The sandwich of current-distributing plates is provided with a plurality or radially extending slots generally indicated at 93, FIGS. 3 and 7, for accommodating longitudinal wires at a radius corresponding to the effective radius of the mandrel being used for making a cage of a particular size. The bolts 73 are arranged in parallel lines at either side of the respective slots 93. For locating brackets for supporting a mandrel of greater diameter than the mandrel 44, the bolts 73 located opposite one another at an appropriate radius are replaced by bolts similar to the bolts 79, FIG. 7, and by suitable brackets for supporting the larger mandrel.

The longitudinal wires 40 are guided to move along longitudinal grooves 88 at the outside of the mandrel by eyes 89, FIG. 5. The electrodes are positioned to engage the longitudinal wires as they are drawn along the mandrel. Mandrels of different diameters are employed to make cages of different diameters. An arrangement of brackets of a different form is illustrated in FIG. 8 as assembled to a mandrel 90 having a greater diameter than that of the mandrel 44.

An alternative form of a mandrel-supporting bracket 96 is illustrated in FIGS. 8, 11 and 12. Each bracket 96 is provided with a foot 97 which is forked to accommodate a T-slot bolt 98 by which the bracket is bolted to the ground current-distributing plate 68. The bracket has a lug 99 which engages the parallel edges 111 of the plate 68 and is slidable along the edges to position the bracket in any desirable location along a slot 93, FIGS. 3 and 7.

The mandrel 90, FIGS. 8, 11 and 12, is constructed similarly to the small mandrel 44. Its peripheral surface includes longitudinal grooves 100 and eyes 101 by which the longitudinal wires 102 are guided lengthwise of the mandrel. Each bracket 96 is tapped to receive a bolt 103 passing through an insulating bushing 105 seated in a hole in the flange 104 of the mandrel and contacting with the end surface 106 of the bracket. An electrode 107 passes through the eye 108 of an eye bolt and the electrode is seized in a set position to contact the wire 102 by tightening a nut 109 to press the electrode into contact with the wall of a hole 110 through the bracket, as best seen in FIG. 11. It will be understood that the same brackets and electrodes are employed when using mandrels of different diameters, it being necessary only that the brackets 96 be positioned along the radial slots in the required location for accommodating the size of mandrel which is to be used. As clearly shown in FIG. 11, the edges 111 in the plate 68 and in the insulating disk 69 define a slot narrower than the slot between the edges 112 of the hot current-distributing plate 70 to insure sufficient clearance between the bolt 98 and the plate 70 to prevent short-circuiting of the welding current.

Figure 6:
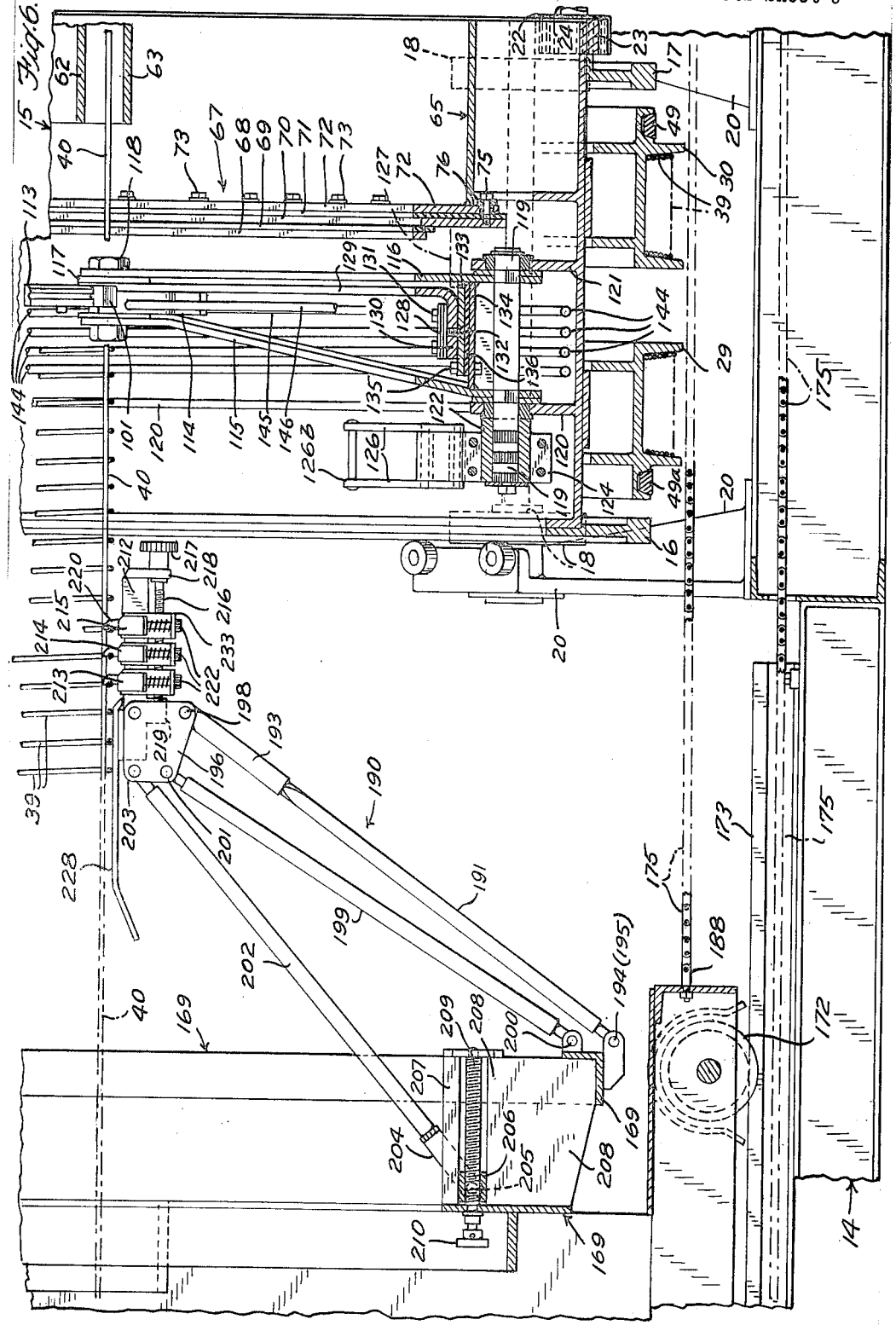

The hot welding electrode 113, FIGS. 3 and 6, is in the form of a shoe having a central groove for engaging and sliding over the circumferential wire 39. The electrode 113 is attached to a block 114 pivotally mounted to the free ends of a pair of arms 115, 116, by an insulating bushing 117 and a bolt 118.

The arms 115 and 116 are mounted on a square portion of a shaft 119 rotatably supported in bearings set in a rib 120 and a lug 121 within the drum 15. A sleeve 122 is splined to one end of the shaft 119. On the sleeve 122 there is mounted a split hub of two parts 124, 125, bolted together, with a loose fit around the sleeve. A finger 122a extends outwardly from the sleeve and through an opening in the hub part 125, FIGS. 9 and 16. The finger limits axial movement of the hub on the sleeve. The hub part 125 carries a finger 125a having a tapped hole for an adjusting screw 125b. The end of the adjusting screw engages the finger 122a on the sleeve 122.

One end of a leaf spring 123 is secured in a socket in the hub part 124 and its other end is pivotally connected to a toggle cam 126 having a roller 126a which bears against the interior surface of the drum 15. The other end 126b of the toggle cam also bears on the interior of the drum. As shown in FIG. 3, the spring is tensioned to exert pressure for clockwise rotation of the hub 124, 125 and of the pivot shaft 119 to press the welding electrode 113 against the circumferential wire 39. Whenever it is desired to relieve the pressure of the welding electrode on the wire, the end 126b of the toggle cam is raised to rotate the cam clockwise and thereby relieve the tension in the spring 123.

Current is conducted from the hot current-distributing plate 70 through a brush 127 bearing upon the plate, a conductor 128, FIGS. 3, 9 and 10, a conducting arm 129, FIGS. 5 and 6, and the copper block 114 to which the electrode 113 is secured. One end of the conductor 128 is bolted to the flange 130 of the arm 129 by a set of standard bolts 131. A set of flat-headed bolts 132 holds an insulating mat 133 to the flange 130. The mat 133 is bolted to a bridge piece 134 with bolts 135. Insulating plate 136 assures protection against short-circuit between bolts 132 and the bridge piece 134. The piece 134 is welded to the arms 115 and 116.

The other end of the conductor 128, FIGS. 3, 9 and 10, is bolted to a pivoted member 137 to which the brush 127 is secured. The member 137 is insulated from a pivot pin 139 by a bushing 138. The pivot pin 139 is screwed into and supported by a plate 140 which is fastened to the rib 120 and the lug 121. The pressure of the brush 127 against the current-distributing plate 70 is maintained by a spring 141 having one end supported in a cup 142 and its other end engaging an insulating pad 143 on the member 137.

The electrode 113 is cooled by a coil of tubing 144 coiled around and secured to the interior of the drum 15, FIGS. 3, 5 and 6. The ends of the tubing 144 are connected to tubes 145 and 146 by swivel joints 147, 148. The other ends of the tubes are connected by flexible joints to a passageway in the block 114. The cooling medium may consist of water or of any other suitable liquid which is circulated through the coil and through the electrode block as the drum rotates. If it is desired to increase the rate of flow of cooling liquid, a pump may be inserted in the circulating system. As shown in FIGS. 3 and 4, a pump 149 is mounted on a table 150 which is pivotally supported by a hinge pin 151 to a plate 152, fastened to the interior of the drum. Any suitable pump such as a gear pump may be employed. The shaft of the pump carries a friction roller 153, FIG. 4. Spring 154, tensioned between the plate 152 and the pump-supporting table 150, maintains the roller 153 in contact with the periphery of the stationary circular plates 70 and 71, whereby to rotate the roller and drive the pump when the drum is rotating.

The locating wheel 45 is grooved to engage and roll along the wire 39, FIG. 3. It presses the wire against the mandrel as the wire is fed to the mandrel by reason of the rotation of the drum. The locating wheel is journalled on a bolt 155 extending between the forked ends of an arm 156 which is pivotally mounted and resiliently biased by means like those hereinbefore described for supporting the arms 115 and 116. The arm 156 is keyed on a shaft 158 journalled and supported between the rib 120 and a lug (not shown) at the inside of the drum 15. A sleeve 157 is splined to one end of a shaft 158. A split hub 161 with a finger 160 in one half and a leaf-spring holder in the other half is loosely mounted on the sleeve. An adjusting screw 159, in threaded engagement with the finger 160, bears upon the finger 162 which is part of the sleeve 157. The hub 161 has fastened to it a leaf spring 163 to which a cam member 164 is attached. In normal operation, the roller 166 of the cam member and the end 167 of the cam member bear upon the interior of the drum 15. When desired, the tension in the spring 163 can be relieved by lifting the end 167 and thus rotating the cam member 164 clockwise, FIG. 3.

A cage 168 is advanced forwardly, or pulled to the left, FIG. 1, by the cage-pulling cart 11. The cage-pulling cart includes a circular frame 169, rigidly mounted on a platform 170 supported on axles for pairs of wheels 171, 172, bearing on a pair of tracks 173, 174. The tracks may be of any length within practical limits.

The cart is moved along the tracks by a roller chain 175 having its ends secured to the cart at 176 and 177. The chain travels over sprocket wheels 178, 179. Sprocket wheel 179 is keyed to the shaft 180 of a speed reducer 181 which is part of a reversible drive mechanism including an air clutch 181a and a reverse drive motor 25a. The forward drive for the speed reducer is derived from the motor 25, through the timing belt connection 26 which also drives the shaft 24 and the drum 15, a timing belt connection 182, a variable speed transmission 183, a timing belt connection 184, a clutch pulley 185 and the clutch 181a. The timing belts are preferably made of rubber reinforced with steel wires. The rate of travel of the cart 11 with respect to the rotation of the shaft 24 and of the drum 15 determines the pitch of the coils in the helix of encircling wire. The pitch may be varied by regulating the variable speed transmission 183.

The forward movement of the cart away from the drum 15 is automatically discontinued when a pin 186 on the cart engages and actuates a limit switch 187. Actuation of the limit switch 187 also stops the rotation of the drum and initiates the return travel of the cart towards the drum.

A pin 188 on the cart and a limit switch 189 is provided to limit the reverse or backward movement of the cart toward the drum.

The circular frame 169 is large enough to surround the largest cage that can be formed on the machine. A plurality of devices are uniformly spaced around the cage for engaging and gripping the exterior of a cage, FIGS. 1 and 2. The devices are adjustable to grip cages of different sizes. Each device includes a four-bar linkage including a link in the form of a wishbone 190 having two legs 191, 192 and a stem 193. The legs are respectively pivotally connected to the frame 169 at 194 and 195, and the stem 193 is pivotally connected to a block 196 at 198. As best seen in FIG. 6, a link 199 of the linkage is pivotally connected to the frame 169 at 200 and to the block 196 at 201. The block 196 constitutes a link between the pivots 198 and 201. The block serves as a carrier for cage-engaging fingers. By virtues of this construction the block or carrier 196 is maintained in a position substantially parallel to the axis of a cage, irrespective of whether it is disposed towards or further away from the axis.

The block 196 is supported at any desired radius by a rod 202 which is pivotally connected to the block at 203. A yoke 204 at the other end of the rod engages pivot studs 205 projecting from opposite sides of a sliding nut 206. The nut is guided for travel along a pair of rails 207 and 208 on the frame 169. The nut 206 is in threaded engagement with a non-translational screw 209 having a handwheel 210 for rotating the screw to locate the nut in any desired position along the screw. As shown in FIG. 6, the nut 206 is in the leftmost position and the rod 202 is so disposed as to support the block 196 at its innermost radial position.

A bar 212 of rectangular cross-section is secured to the block 196 and serves as a support and guide rail for a series of slides 213, 214 and 215. Each of the slides has a rectangular hole for engaging the bar 212 and a threaded bore engaging a screw 216 having a handwheel 217. The screw is rotatably supported on the bar and held against axial movement by a plate 218 secured to the free end of the bar 212 and by a member 219 extending perpendicularly from the bar. The screw 216 is rotated whenever it is desired to adjust the horizontal location of the cage-engaging fingers 220 with respect to the encircling wire of a cage.

Each of the slides 213, 214 and 215 carries a cage-engaging finger 220 at opposite sides of the bar 212. Three of the fingers at one side of the bar are shown in FIGS. 6 and 14. Since all of the fingers are alike it will suffice to describe one of them. Each finger 220 is in the form of a plunger slidable within a bore in a boss 221 at one end of a slide 213, 214 or 215. The plunger 220 is engaged by a stripper bolt 222 extending through a plate 223 which is secured to a slide 213, 214 or 215. A spring 224 is tensioned between the plate 223 and a washer 225 at the inner end of the plunger. The outer end of the plunger has a sloping side 226 which slides over the helical wire of a cage and causes the plunger and bolt to slide outwardly against the tension of the spring 224 when the cage-pulling cart travels backward. A groove 227 is provided to engage a circumferential wire during a cage-pulling movement of the cart.

A shoe 228 is bolted to the bar 212 on each block 196 in order to determine the closest approach of a gripping device to a cage. The shoes of the various cage-engaging devices slide over the coils of encircling wire as the cart is moved and as the cart travels towards the drum the fingers 220 ratchet over the coils.

At the beginning of the forming of a cage, the longitudinal wires are drawn from their respective supply coils (not shown) and extended along the longitudinal grooves of a mandrel. The drum is then rotated to apply at least one turn of circumferential wire around the mandrel and to weld the circumferential wire to all the longitudinal wires. The cage-pulling cart is then moved to engage a turn or several coils of wire which have been welded to the longitudinal wires. The machine is then placed in operation to continue the laying and welding of circumferential wire as the pulling car pulls the cage and continues to draw the longitudinal wires from their supply coils.

The output side of the transformer is energized each time the electrode 113, FIG. 3, passes opposite a longitudinal wire 40. The welding current is caused to flow each time a switch 229, FIG. 17, is actuated by each of a series of pins 230 which are mounted on the drum 15. A pin 230 is provided for each longitudinal wire-electrode being used. As diagrammatically illustrated in FIG. 17, the oncoming pin will actuate the switch 229 in timed relation to the passage of the electrode 113 opposite the fixed electrode 231.

The machine is adapted to operate automatically to form a continuous cage of indefinite length so long as wire is supplied to the machine. The limit switches 187 and 189 automatically control the forming of a cage equal to or longer than the distance of travel of the cage-pulling cart. A vertically adjustable saddle 232 is provided to support the portion of a cage which extends beyond the forward limit of travel of the cart.

In forming a continuous cage it is sometimes desired to provide close loops of two or more turns of encircling wire separating one another to provide cut-off locations therebetween to enable sections of individual cages of predetermined lengths to be cut from a continuous cage and separated for use in reinforcing pipe sections of a given length. The close loops are to reinforce the ends of the wire helix of a cage and to facilitate the connection to a cage of other reinforcing members of a pipe.

A limit switch 233 is provided for temporarily disengaging the clutch 181a to arrest the forward movement of the pulling cart and allow the forming of a closed loop of wire as the drum 15 continues to rotate. After the close loop has been formed, the clutch 181a is re-engaged and the pulling cart resumes its forward movement until it is stopped again by the actuation of a limit switch 234 to allow a second close loop of wire to form. The switch 234 effects the same controls as the switch 233. As the second loop is completed the cart automatically resumes its forward travel.

When the cart reaches the limit switch 187, the motor 25 is stopped and the forward movement of the cart and the rotation of the drum 15 ceases. The actuation of the limit switch 187 effects the disengagement of the clutch 181a and causes the reversing motor 25a to drive the speed reducer 181 to move the cart toward the drum 15. The drum 15 remains stopped until the cage-pulling cart arrives at its limit of travel toward the drum where the limit switch 189 is actuated. The limit switch 189 discontinues the operation of the motor 25a, causes the clutch 181a to engage the input shaft of the speed reducer 181 and starts the motor 25 to continue the forming of a continuous cage.

The operation of the machine will be apparent to those skilled in the art in view of the foregoing disclosure. The principle of the invention, together with apparatus which is now considered to represent the best embodiment thereof, have been described in accordance with the provisions of the patent statutes, but it is desired it be understood that the apparatus disclosed is only illustrative and that the invention can be carried out by other means. Also, while the apparatus is designed to use the various features and elements in the combinations and relations described, some of these may be altered and others omitted without interfering with the invention and the general results outlined.

What is claimed is:

1. In a machine for making a wire cage, means for guiding a plurality of longitudinal wires in spaced relationship around a mandrel, means for applying a circumferential wire around said longitudinal wires, said last-named means including a rotatable drum, means for rotating said drum, electrodes for engaging said longitudinal wires, an electrode shoe for contacting said circumferential wire, means mounted on said drum for supporting said electrode shoe, a fixed support, a pair of current-distributing plates mounted on said support, said plates being insulated from each other and from said support, a transformer mounted on said support, said transformer having its output terminals connected respectively to respective ones of said pair of current-distributing plates, means for electrically connecting one of said pair of distributing plates to said first-named electrodes, means for electrically connecting the other of said plates to said electrode shoe, said last-named means including a brush in sliding contact with the other of said pair of distributing plates, means for energizing said transformer in timed relation to the rotation of said drum to effect welding of the circumferential wire to said longitudinal wires as said electrode shoe is carried across their intersections, and means for advancing a cage formed by welding said circumferential wire to said longitudinal wires.

2. In a machine for making a wire cage, means for guiding longitudinal wires in spaced relationship around a mandrel, means for advancing said longitudinal wires axially along the mandrel, means for applying a circumferential wire around said longitudinal wires, said last-named means including a rotatable drum, means for rotating said drum, electrodes for engaging said longitudinal wires, a welding electrode, a pivoted support carried by said drum for supporting said welding electrode, spring means acting between said pivoted support and said drum for urging said welding electrode into contact with said circumferential wire, a stationary frame, a pair of current-distributing plates mounted on said frame and insulated from each other and from said frame, a transformer mounted on said frame, said transformer having its output terminals connected respectively to respective ones of said current-distributing plates, means attached to one of said distributing plates for supporting said first-named electrodes, a brush carried by said drum and supported in sliding engagement with the other of said distributing plates, an electrical connection between said brush and said welding electrode, and means for energizing said transformer each time said welding electrode is carried across an intersection of said circumferential wire with one of said longitudinal wires.

3. In a machine for making a wire cage, means for guiding longitudinal wires in spaced relationship around a mandrel, means for advancing said longitudinal wires axially along the mandrel, means for applying a circumferential wire around said longitudinal wires, said last-named means including a rotatable drum, means for rotating said drum, electrodes for engaging said longitudinal wires, a welding electrode for engaging said circumferential wire, means for pivotally supporting said welding electrode on said drum, spring means for urging said welding electrode into contact with said circumferential wire, a cam member acting between said spring means and said drum whereby the tension of said spring may be relieved to relieve the pressure of said welding electrode on said circumferential wire, a stationary frame, a transformer mounted on said frame, a pair of current-distributing plates mounted on said frame, said plates being insulated from each other and from said frame, said transformer having its output terminals connected respectively to respective ones of said pair of distributing plates, means for electrically connecting one of said pair of distributing plates to said first-named electrodes, means for electrically connecting the other of said plates to said welding electrode, said last-named means including a brush in sliding contact with said other of said pair of distributing plates, and means for energizing said transformer each time said welding electrode is carried across an intersection of said circumferential wire with one of said longitudinal wires.

4. In a machine for making a wire cage, means for guiding longitudinal wires in spaced relationship around a mandrel, means for advancing said longitudinal wires axially along the mandrel, a drum for applying a circumferential wire around said longitudinal wires, means for rotating said drum, electrodes for engaging said longitudinal wires, a welding electrode for engaging said circumferential wire, means mounted on said drum for supporting said welding electrode, a stationary support, a pair of current-distributing plates mounted on said support and insulated from each other and from said support, said current-distributing plates having radially disposed slots for the passage of said longitudinal wires therethrough, a transformer mounted on said support, electrical conducting means between said transformer and said current-distributing plates, means attached to one of said distributing plates for supporting said first-named electrodes, a brush carried by said drum and bearing on the second of said distributing plates, an electrical connection between said brush and said welding electrode, and means for energizing said transformer.

5. In a machine for making a wire cage, means for guiding longitudinal wires in spaced relationship around a mandrel, means for advancing said longitudinal wires axially along the mandrel, means for applying a circumferential wire around said longitudinal wires, said last-named means including a rotatable drum, means for rotating said drum, electrodes for engaging said longitudinal wires, a welding electrode for engaging said circumferential wires, means for supporting said welding electrode on said drum, a stationary frame adjacent one end of said drum, a pair of current-distributing plates, insulating plates between said current-distributing plates, a support plate for supporting said current-distributing plates, means attaching said support plate to said stationary frame, an insulating plate separating said current-distributing plates from the support plate, all of said plates having radially extending slots for the passage of said longitudinal wires therethrough, conducting means for supporting said first-named electrodes on one of said current-distributing plates, a sliding contact with the other of said current-distributing plates, conducting means between said sliding contact and said welding electrode, a stationary transformer, said transformer having its output terminals connected respectively to the respective current-distributing plates, and means for energizing said transformer each time said welding electrode is carried over an intersection of said circumferential wire with one of said longitudinal wires.

6. In a machine for making a wire cage, means for guiding longitudinal wires in spaced relationship around a mandrel, means for advancing said longitudinal wires axially along the mandrel, means for applying a circumferential wire around said longitudinal wires, said last-named means including a rotatable drum, means for rotating said drum, electrodes for engaging said longitudinal wires, a welding electrode for engaging said circumferential wire, means for supporting said welding electrode on said drum, a stationary frame, a pair of current-distributing plates, a support plate for supporting said current-distributing plates, means attaching said support plate to said stationary frame, insulating plates between said current-distributing plates and between the current-distributing plates and the supporting plate, means securing all of said plates together in sandwich form and insulating each from the other, brackets, one for each of said longitudinal wires, said brackets distributed around and supported by one of said current-distributing plates, means on each of said brackets for supporting one of said first-named electrodes, a transformer, a conductor secured to said last-named current-distributing plate and connecting with an output terminal of said transformer, a conductor secured to the other of said current-distributing plates and connecting with the other output terminal of said transformer, a sliding contact with the second of said current-distributing plates, conducting means between said sliding contact and said welding electrode, and means for energizing said transformer each time said welding electrode is carried over an intersection of said circumferential wire with one of said longitudinal wires.

7. In a machine for making a wire cage, means for guiding longitudinal wires in spaced relationship around a mandrel, means for advancing said longitudinal wires axially along the mandrel, a drum for applying a circumferential wire around said longitudinal wires, means for rotating said drum, an electrode for each of said longitudinal wires, a welding electrode comprising an electrode shoe for engaging said circumferential wire, means mounted on said drum for supporting said welding electrode, a fixed support, a transformer mounted on said fixed support, a pair of current-distributing plates mounted on said support, said plates being insulated from each other and from said support, said transformer having its output terminals connected respectively to respective ones of said pair of said distributing plates, means for electrically connecting one of said pair of distributing plates to said first-named electrodes, means for electrically connecting the other of said plates to said electrode shoe, means carried by said drum for cooling said electrode shoe, said last-named means including a coil of tubing for circulating fluid through said welding electrode-supporting means, and means for energizing said transformer as said welding electrode passes over crossing points of said circumferential and longitudinal wires.

8. In a machine for making a wire cage, a mandrel, means for guiding longitudinal wires in spaced relationship around said mandrel, means for applying a circumferential wire around said longitudinal wires, means for rotating said wire-applying means, means for welding said circumferential wire to said longitudinal wires at intersections of said circumferential and longitudinal wires, a cart for pulling a cage formed by said longitudinal wires and said circumferential wire, track means for guiding the movement of said cart away and towards said mandrel, means for actuating said cart, a frame mounted on said cart, said frame encircling the cage, and means carried by said frame for engaging said cage, said means comprising devices distributed in spaced relationship around said frame and having fingers for engaging the circumferential wire of said cage.

9. In a machine for making a wire cage, a mandrel, means for guiding longitudinal wires in spaced relationship around said mandrel, means for applying a circumferential wire around said longitudinal wires, means for welding said circumferential wire to said longitudinal wires at intersections of said circumferential and longitudinal wires, a cart for pulling a cage formed by said longitudinal wires and said circumferential wire, track means for guiding the movement of said cart away and towards said mandrel, means for actuating said cart, a frame mounted on said cart, said frame encircling the cage, and means carried by said frame for engaging said cage, said means comprising a plurality of devices distributed in spaced relationship around said frame, said devices including a plurality of arms pivotally mounted on said frame and members mounted to the free ends of said arms for engaging the cage.

10. The combination set forth in claim 9 including means for adjustably positioning said arms to locate said cage-engaging members on circles of different diameters for engaging cages of different diameters.

11. The combination set forth in claim 9 in which said cage-engaging members include fingers constructed and arranged to positively engage the circumferential wire of the cage.

12. In a machine for making a wire cage, a mandrel, means for guiding longitudinal wires in spaced relationship around said mandrel, means for applying a circumferential wire around said longitudinal wires, means for welding said circumferential wire to said longitudinal wires at intersections to form a wire cage, a cart for pulling a cage formed by said longitudinal wires and said circumferential wire, track means for guiding the movement of said cart away and towards said mandrel, means for actuating said cart, a frame mounted on said cart, said frame encircling the cage, means carried by said frame for engaging said cage, said means including devices distributed in spaced relationship around said frame, each of said devices including a plurality of arms pivotally supported on said frame, a member pivotally connected to the free ends of said arms, a finger slidably mounted on said member for engaging said cage, and spring means for urging said finger radially inwardly to engagement with said cage.

13. In a machine for making a cage having a wire helically wound around longitudinal wires circumferentially spaced about the cage, said machine including a rotatable drum, means for driving said drum, a stationary mandrel, means supporting said mandrel centrally of said drum, a pair of wire-dispensing spools comprising a first spool mounted for rotation on the exterior of said drum and a second spool mounted for rotation on the exterior of said drum alongside said first spool, said spools being individually rotatable independently of one another, means on said drum for guiding wire feeding from one or the other of said spools to said mandrel, power driven means for rotating said first spool, power driven means for rotating said second spool, each of said power driven means being individually operable independently of the other, said first-named power driven means being operable to rotate said first spool for winding a reserve supply of wire onto said first spool while said second-named power driven means is operating to apply a counter torque on said second spool to tension wire feeding from said second spool to said mandrel, said second-named power driven means being operable to rotate said second spool for winding a reserve supply of wire onto said second spool while said first-named power driven means is operating to apply a counter torque on said first spool to tension wire feeding from said first spool to said mandrel.

14. In a machine for making a cage having a wire helically wound around longitudinal wires circumferentially spaced about the cage, said machine including a stationary mandrel having a substantially continuous outer peripheral surface around which the cage is formed, a rotatable drum, means supporting said mandrel centrally of said drum, a spool from which wire is fed to said drum, means rotatably supporting said spool on the exterior of said drum, means for driving said drum to draw wire from said spool to wind a wire around said mandrel, means on said drum for guiding the wire travelling between said spool and said mandrel, power driven means for applying torque to said spool to affect the rotation of the spool relative to said drum, said power driven means operable to exert torque on said spool acting on the spool reversely to the torque exerted on the spool by the pull of the wire being wound onto said mandrel by the rotation of said drum whereby the wire is maintainable under a uniform tension as it is laid against the outer peripheral surface of the mandrel.

15. In a machine according to claim 14, said wire-guiding means including resilient means for pressing the wire against said mandrel as said wire comes onto the mandrel.

References Cited by the Examiner

UNITED STATES PATENTS

| | | | |
|---|---|---|---|
| 1,744,399 | 1/1930 | Lunn | 219—120 |
| 1,928,534 | 9/1933 | Halkyard et al. | 219—56 |

RICHARD M. WOOD, *Primary Examiner.*

B. A. STEIN, *Assistant Examiner.*